United States Patent
Packer et al.

(10) Patent No.: US 8,585,952 B2
(45) Date of Patent: Nov. 19, 2013

(54) PRESSURE MOLDED PREFORM PROCESS FOR COMPOSITE STRUCTURES

(75) Inventors: Bradford P. Packer, Logan, UT (US); Barrett B. Milenski, Salt Lake City, UT (US); Russell H. Montgomery, Ogden, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 1005 days.

(21) Appl. No.: 12/483,613

(22) Filed: Jun. 12, 2009

(65) Prior Publication Data

US 2010/0316837 A1  Dec. 16, 2010

(51) Int. Cl.
*B65H 81/00* (2006.01)

(52) U.S. Cl.
USPC ............................. 264/295; 264/294; 264/313

(58) Field of Classification Search
USPC ......... 264/285, 294, 295, 313, 314, 160, 157; 156/463, 443
See application file for complete search history.

(56) References Cited

U.S. PATENT DOCUMENTS

| | | | | |
|---|---|---|---|---|
| 3,039,372 A * | 6/1962 | La Bombard | ................. | 493/396 |
| 3,615,149 A * | 10/1971 | Malone et al. | ................ | 138/118 |
| 5,145,621 A * | 9/1992 | Pratt | .............................. | 264/102 |
| 5,648,109 A * | 7/1997 | Gutowski et al. | ............. | 425/504 |
| 6,096,164 A | 8/2000 | Benson et al. | | |
| 7,513,769 B2 | 4/2009 | Benson et al. | | |
| 2005/0056362 A1* | 3/2005 | Benson et al. | ................ | 156/163 |
| 2005/0191919 A1* | 9/2005 | Krogager et al. | ............... | 442/59 |

\* cited by examiner

*Primary Examiner* — Galen Hauth (74) *Attorney, Agent, or Firm* — IPLM Group, P.A.

(57) ABSTRACT

A method of forming a composite elongated member is provided. The method includes forming a preform having at least one of a groove and a ridge. The at least one of a groove and a ridge extends a length of the preform. The preform is then shaped to create the elongated member having a desired cross-sectional shape with at least one curve formed along at least one of the at least one groove and ridge.

21 Claims, 13 Drawing Sheets

Nested Preforms ⇩

FIG. 7B

Pattern Cutter ⇩

FIG. 7C

Trimmed Preforms ⇩

Forming ⇩

PRESSURE MOLDED PREFORM PROCESS FOR COMPOSITE STRUCTURES

BACKGROUND

Composite structures made of fiber reinforced resin provide relatively strong structures that are light weight that have many applications such as but not limited to stiffeners for aircraft. One method of forming composite structures is with fibers that are pre-pregnanted (pre-preg) with resin. Once positioned in the desired shape, the fibers and resin are heated to cure the resin thereby bonding the fibers together to form the structure. In the aerospace industry it is common to make elongated stiffeners having various cross-sectional shapes that commonly define the stiffeners such as a hat, a C and a Z shaped stiffeners. One method of forming stiffeners is by laying up layers of fiber to form a flat preform. The preforms are then hot-drape formed or compression molded on a mandrel to create a desired cross-sectional shape. After hot-drape forming, the parts are either co-cured to a laminate or cured in an autoclave and secondary bonded/fastened to a structure. One limitation of the hot-drape method is that winkles commonly occur in corners when forming a desired cross-sectional shape (i.e. C shape, Z shape, hat shape, etc.) in a structure. The wrinkles can lead to an undesired weak point in the formed structure.

For the reasons stated above and for other reasons stated below which will become apparent to those skilled in the art upon reading and understanding the present specification, there is a need in the art for methods of forming efficient and effective composite structures without wrinkles in the corners.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of forming a composite elongated member is provided. The method comprises forming a preform having at least one of a groove and a ridge. The at least one of a groove and a ridge extends a length of the preform. The preform is then shaped to create the elongated member having a desired cross-sectional shape with at least one bend formed along at least one of the at least one groove and ridge.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical and mechanical changes may be made without departing from the spirit and scope of the present invention. The following detailed description is, therefore, not to be taken in a limiting sense, and the scope of the present invention is defined only by the claims and equivalents thereof.

Figure 1:
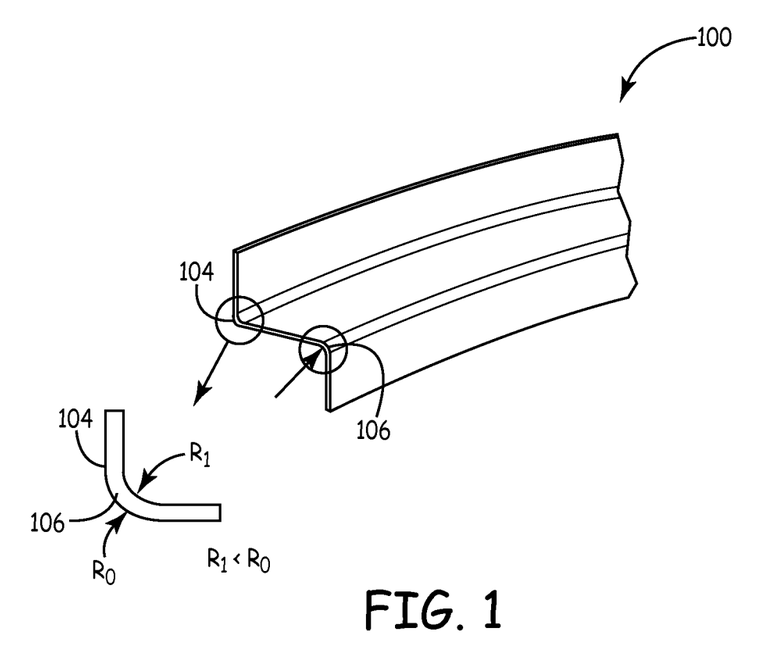
FIG. 1 is a front perspective view of an elongated member illustrating a corner of one embodiment of the present invention.

Embodiments of the present invention provide elongated composite members, generally referred to herein as elongated members, with varying cross-sectional shapes having corners that form the shapes that are generally free of wrinkles. Referring to FIG. 1, a formed elongated member 100 having a desired shape is illustrated. In particular, FIG. 1 illustrates the use of corners 104 and 106 to form what is commonly called "Z-shaped member." That is, a cross-sectional shape of the elongated member 100 is commonly referred to as a "Z shape." As FIG. 1 illustrates the inner radius $R_I$ is smaller than the outer radius $R_O$ at curves 104 and 106 (or bends) of the elongated member 100. The difference in the radiuses leads to wrinkles in typically hot-draped formed elongated members. However, as illustrated in FIG. 1, the corners formed by embodiments are relatively wrinkle free. In embodiments, a preform is made that includes ridges and/or grooves. The ridges and/or grooves are located where corners that define the cross-sectional shape are to be formed during the shaping of the elongated member. The use of the ridges and grooves provides relatively wrinkle free corners as illustrated in FIG. 1.

Figure 2A:
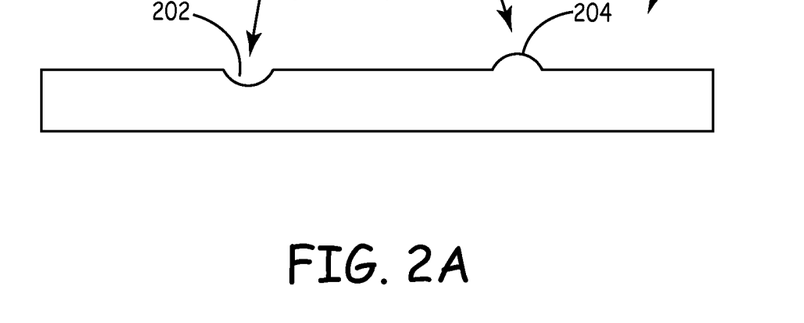
FIG. 2A is an end view of a tool of one embodiment of the present invention.
Figure 2B:
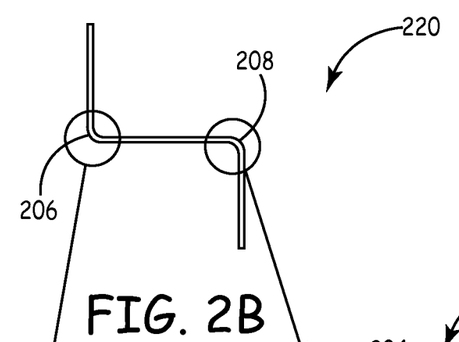
FIG. 2B is an end view of a formed elongated member from the tool of FIG. 2A of one embodiment of the present invention.

Referring to FIGS. 2A and 2B, an illustration of a forming plate 200 of an embodiment that is used in forming a Z-shaped elongated member 220 is shown. In particular FIG. 2A shows an end view of the forming plate 200 (or mandrel) illustrating that the forming plate 200 has a groove 202 and a ridge 204. The end view of the forming plate 200 illustrates the cross-sectional shape of the groove 202, in this embodiment, is a recessed arc and the cross-sectional shape of the ridge in this embodiment is an extended arc. The groove 202 and the ridge 204 each extend the length of the forming plate 200. In embodiments, a preform is formed, or laid up, over the forming plate 200. The resulting preform will have corresponding curves as a result of groove 202 and the ridge 204 in the forming plate 200. An example of such a preform is preform 720 of FIG. 8A. FIG. 2B illustrates an end view of an elongated member 220 (which is Z-shaped in this example) that is formed from a preform laid out on forming plate 200 of FIG. 2A. In this example embodiment, the groove 202 of the forming plate 200 is used when forming curve 206 (or bend 206) in the Z-shaped elongated member 220 and the ridge 204 of the forming plate 200 is used when forming curve 208 (or bend 208) of the Z-shaped elongated member 220. In particular, the groove 202 and ridge 204 of the forming plate 200 provide a preform that accommodates the radii of curves 206 and 208 in the elongated member 220 to achieve curves free from wrinkles. One method of forming the elongated member 220 from a preform that is formed on the forming plate 200 is by compressing the preform on a forming tool. One compression method is further discussed below in regards to FIGS. 8A and 8B.

Figure 3A:
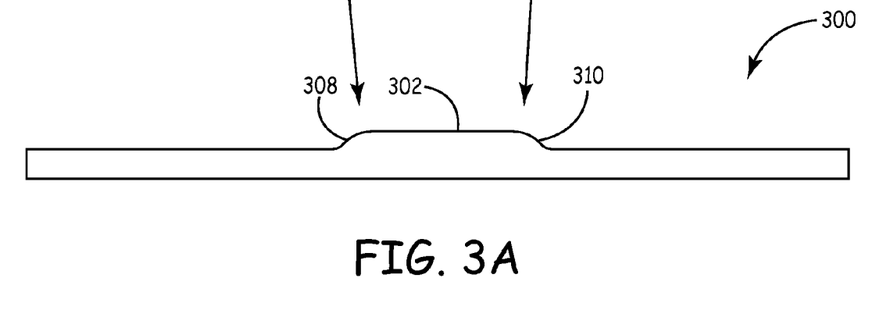
FIG. 3A is an end view of a tool of another embodiment of the present invention.
Figure 3B:
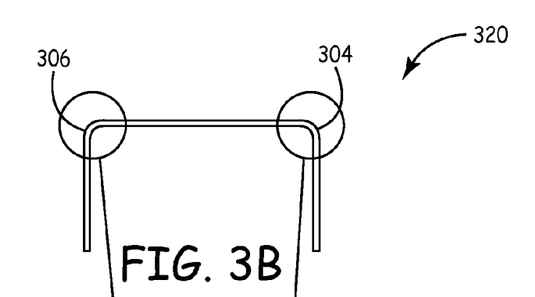
FIG. 3B is an end view of a formed elongated member from the tool of FIG. 3A of one embodiment of the present invention.
Figure 4A:
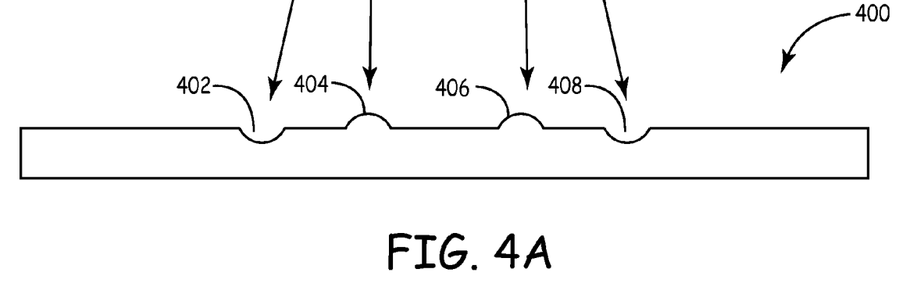
FIG. 4A is an end view of a tool of still another embodiment of the present invention.
Figure 4B:
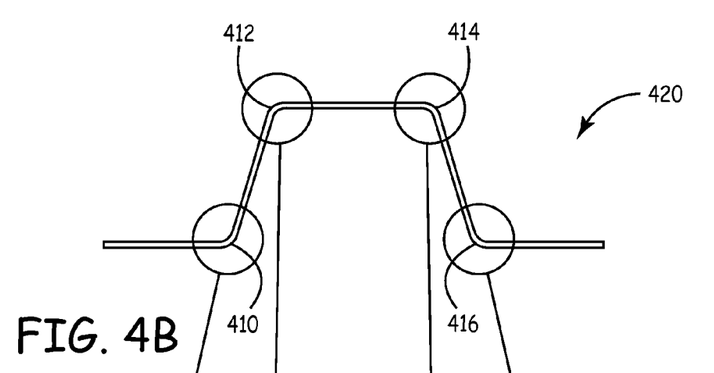
FIG. 4B is an end view of a formed elongated member from the tool of FIG. 4A of one embodiment of the present invention.

FIGS. 3A and 3B illustrate another example of a forming plate 300 used in the forming of an elongated member 320. In particular, in this example embodiment, the forming plate 300 as illustrated in this end view of FIG. 3A includes a relatively large ridge 302 having a first arcing termination end 308 and a second arcing termination end 310. As the end view of the corresponding formed C-shaped elongated member 320 of FIG. 3B illustrates, corner 306 is formed with the use of first arcing termination end 308 of ridge 302 of the tool forming plate and corner 304 of the C-shaped elongated member 320 is formed with the use of the second arcing termination end 310 of ridge 302 of the forming plate 300. Similar to the formation of elongated member 220 discussed above, elongated member 320 would be formed from a preform laid up on forming plate 300. Further another example of a forming plate 400 and an elongated member 402 that is made with use of forming plate 400 is illustrated in FIGS. 4A and 4B. In FIG. 4A an end view of forming plate 400 is illustrated having grooves 402 and 408 and ridges 404 and 408. As the end view of the Hat-shaped elongated member 420 of FIG. 4B illustrates, corner 410 of elongated member 420 is formed with the use of groove 402 of forming plate 400, corner 412 of the elongated member 420 is formed with the use of ridge 404 of forming plate 400, corner 414 of elongated member 420 is formed with the use of ridge 406 of forming plate 400 and corner 416 of elongated member 420 is formed with the use of groove 408 of forming plate 400. Hence, as illustrated above, different cross-sectional shapes of elongated members can be formed with different preforms laid up on different forming plates. In FIGS. 2A, 2B, 3A, 3B, 4A and 4B the respective ridges and grooves in forming plates 200, 300 and 400 are exaggerated for illustration purposes. For example, if a typical part radius in an elongated member is 0.250 to 0.500 inches, then the ridges and grooves in a respective forming plate would be quite small.

Figure 5:
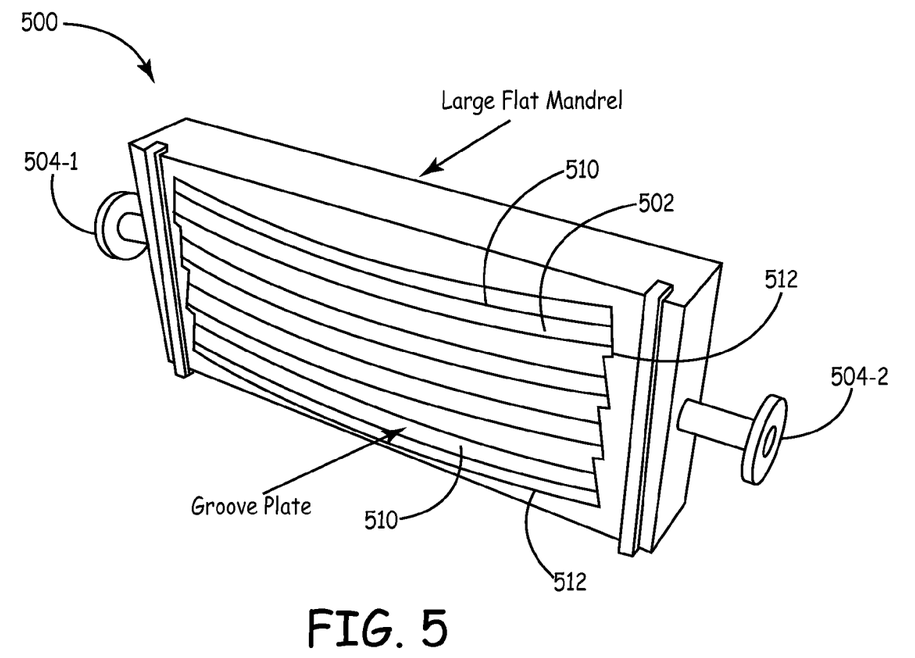
FIG. 5 is a front perspective view of a mandrel used to form preforms of one embodiment of the present invention.
Figure 6:
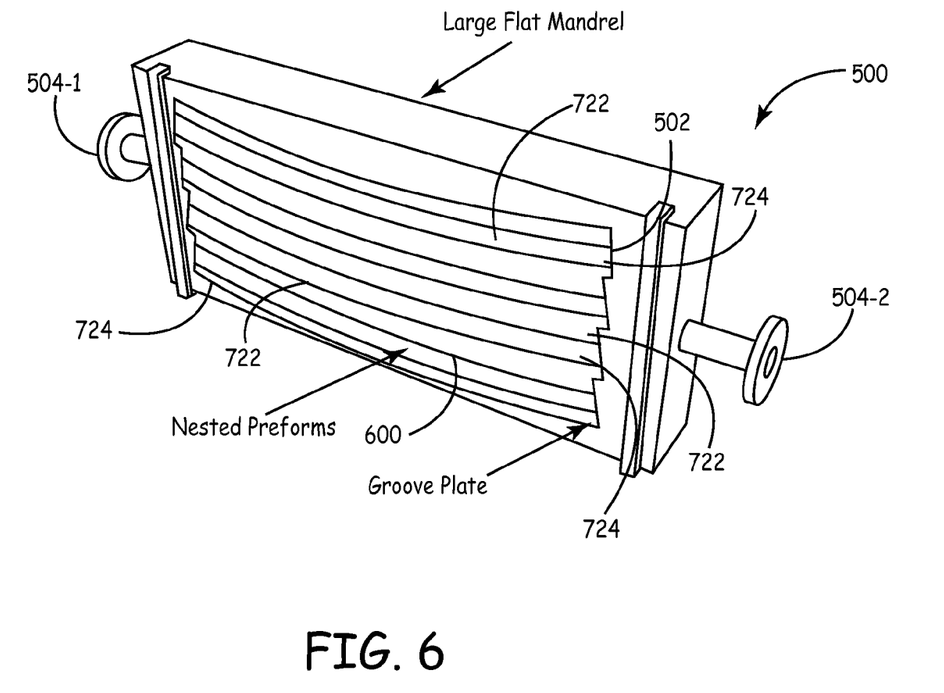
FIG. 6 is a front perspective view of the mandrel of FIG. 5 including a formed nested preform blank of one embodiment of the present invention.

A mandrel 500 used on one embodiment to make preforms is illustrated in the front perspective view of FIG. 5. In particular, the mandrel 500 includes connectors 504-1 and 504-2 used to move and secure the mandrel 500 at a give location. In other embodiments using a gantry style lay-up system, the mandrel 500 is simply placed face up on a support surface. In these embodiment connectors 504-1 and 504-2 are not needed. The mandrel 500 also includes a forming plate 502 upon which preforms are made. The plate 502 includes desired grooves 510 and ridges 512 that form the desired grooves 510 and ridges 512 in the preforms. In this embodiment, the plate 502 allows for more than one preform to be laid up a time. In fact, in the example embodiment of FIG. 5, the plate 502 forms a preform blank upon which 4 different curved preforms are created as discuss below. In one embodiment, the preforms are formed with fiber placement (FP) technology. An example of FP technology is illustrated in commonly assigned U.S. Pat. No. 6,096,164 entitled "Multiple Axes Fiber Placement Machine" which is incorporated herein by reference. Referring to FIG. 6, a front perspective view of the mandrel 500 having a nested preform blank 600 formed thereon is illustrated. Each preform in the nested preform blank 600 is formed with respective grooves 722 and ridges 724 as illustrated.

Figures 7A, 7B:
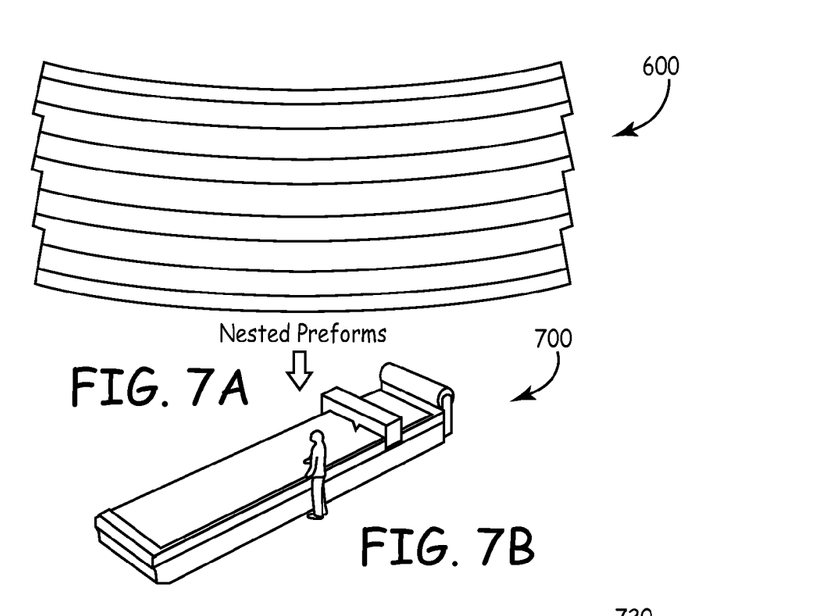
FIGS. 7A through 7D illustrate the formation of an elongated member from a nested preform blank of one embodiment of the present invention.
Figure 7C:
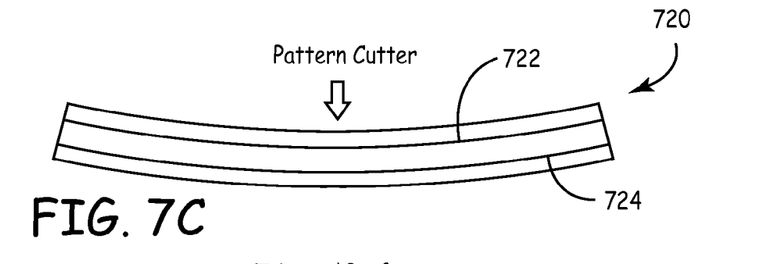
Figure 7D:
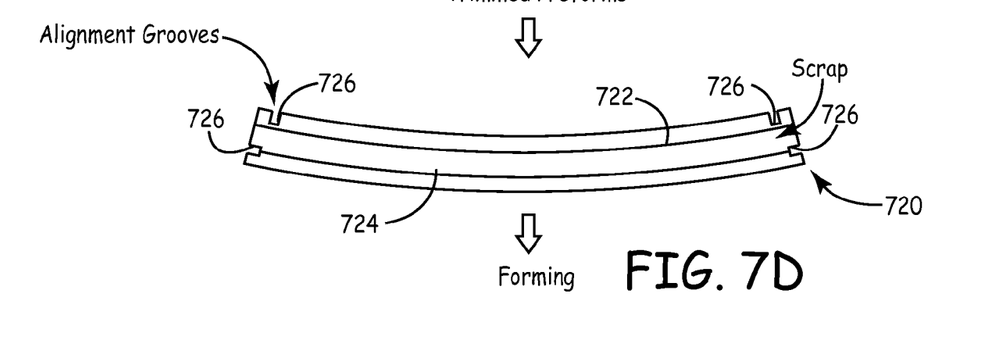

One method of obtaining preforms 720 from the nested preform blank 600 is illustrated in FIGS. 7A through 7D. FIG. 7A illustrates a top view of the nested preform blank 600 removed from plate 502 of the mandrel 500. The nested preform blank 600 is then placed on the pattern cutter 700 illustrated in the side view of FIG. 7B. The pattern cutter 700 then trims the nested preform blank 600 to form the plurality of preforms 720 as illustrated in FIG. 7C. In an embodiment, the alignment grooves 726 are further cut out of the preforms as illustrate in FIG. 7D. The alignment grooves 726 are used to align formed elongated members from the preforms 720 in select positions. As further illustrated in FIGS. 7C and 7D the preforms 720 include the grooves 722 and ridges 724 formed by the mandrel 500.

Figure 8A:
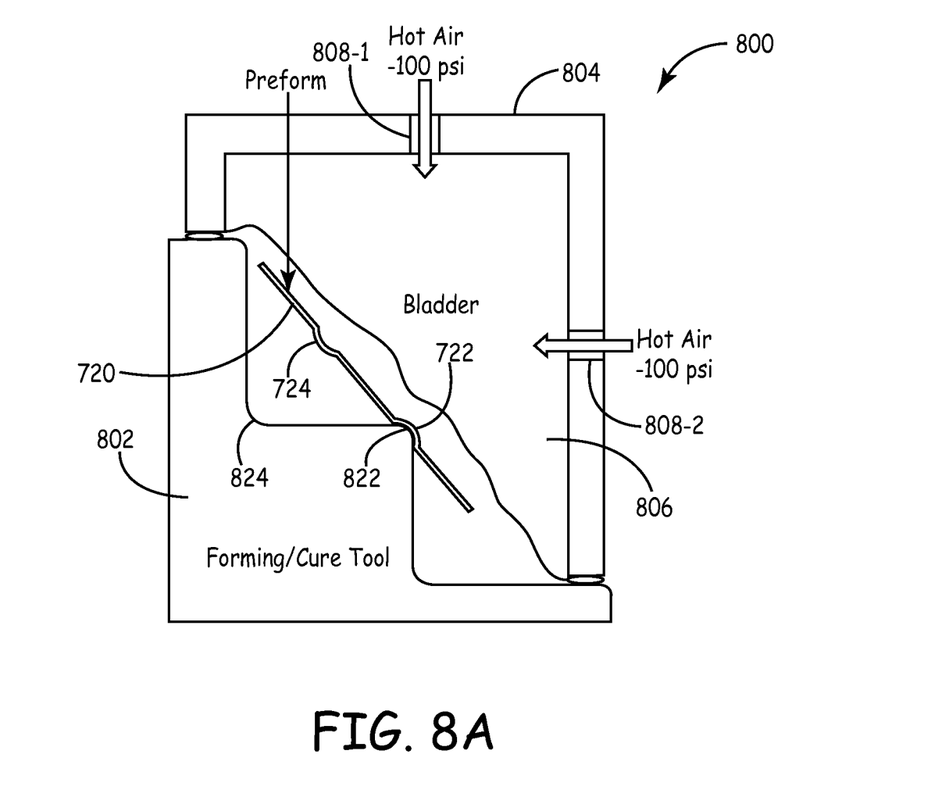
FIG. 8A is a cross-sectional side view of a forming station having a preform positioned therein of one embodiment of the present invention.
Figure 8B:
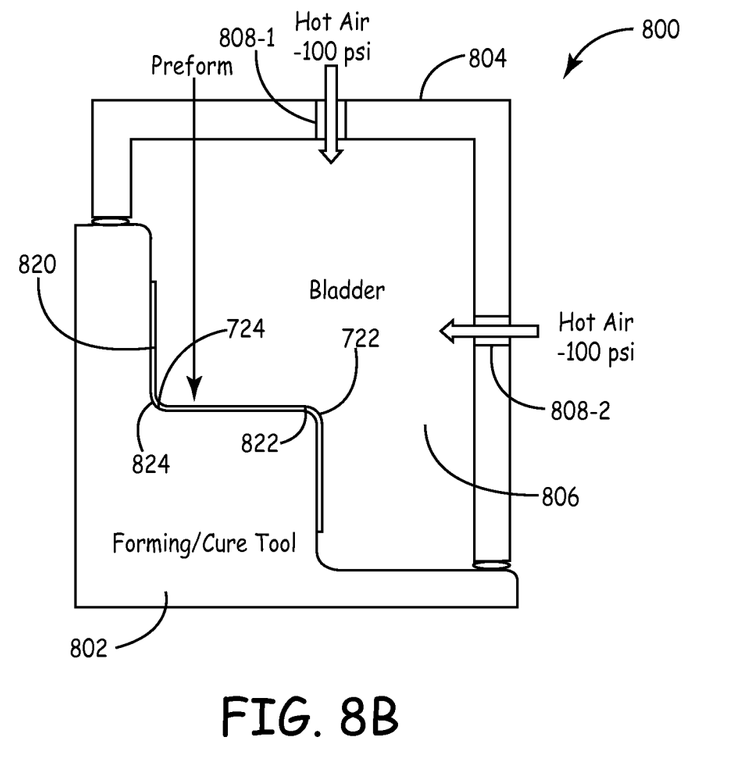
FIG. 8B is a cross-sectional side view of the forming station of FIG. 8A illustrating the formation of an elongated member by compression of one embodiment of the present invention.

Once the preforms 720 are formed they are then shaped into elongated members having the desired cross-sectional shape. Referring to FIG. 8A, a preform 720 is placed in a forming station 800 that is used in one embodiment to shape the preform 720. As illustrated, the preform is placed on a forming tool 802 that has the desired cross-sectional shape. The preform 720 is aligned with the forming tool 802 such that groove 722 is aligned with outward corner 822 and ridge 724 is aligned with inward corner 824. The forming station 800 as illustrated includes a pressure box 804 that is attached to the forming tool 802. The preform 720 is positioned in the pressure box 804. Also included in the pressure box 804 is a bladder 806. The bladder 806 is made from an elastic material. The pressure box 806 includes two openings 808-1 and 809-2 in this embodiment that allow hot air to pass into the pressure box 804 to inflate the bladder 806. Once the preform 720 is positioned, the hot air passing through openings 808-1 and 808-2 in the pressure box 804 causes the bladder 806 to compress the preform 720 on the forming tool 802 to form the desired cross-sectional shaped elongated member 820. This is illustrated in FIG. 8B. Once, compressed for a select period of time to form the elongated member 82 from the preform 720, the hot air is allowed to escape out the openings 808-1 and 808-2 which causes the bladder to retreat from the elongated member 820. The completed elongated member 820 is then removed from the forming station 800. Although, the above embodiment uses a pressure box 804 to compress and form the elongated members 820, other techniques that compress the preforms 720 having ridges and grooves can be used to form elongated members 820. In further one embodiment, the forming tool is also a curing tool 802 that is heated. In this embodiment, the curing tool 802 is not only used to shape the elongated member 820 but is also used to cure the elongated member 820. In this out-of autoclave cure embodiment, the amount of time the formed elongated member 820 is maintained on the forming tool 802 and the temperature of the curing tool 802 is selected to achieve a desired curing of the elongated member. Moreover, the heat and pressure applied to during the forming process (lay up and shape forming) should cause the elongated members to be consolidated enough that they may not require an autoclave to produce low void content parts.

In one embodiment, an Automatic Stiffener and Forming Machine (ASFM) is used to form the cross-sectional shape from a preform. An example, of an ASFM and application is described in commonly assigned U.S. Pat. No. 7,513,769 entitled "Apparatus and Methods for Forming Composite Stiffeners and Reinforcing Structures," which is incorporated herein by reference. The ASFM, which may be a radial (ASFM-R) for a curved elongated members or a linear (ASFM-L) used for linear elongated members is used to compact the preform to form the desired cross-sectional shape in the elongated member. In these embodiments, the preform is positioned on a shaped forming tool and rollers of the ASFM-R or ASFM-L are used to compress the preform on the forming tool to achieve the desired shape.

Figure 9:
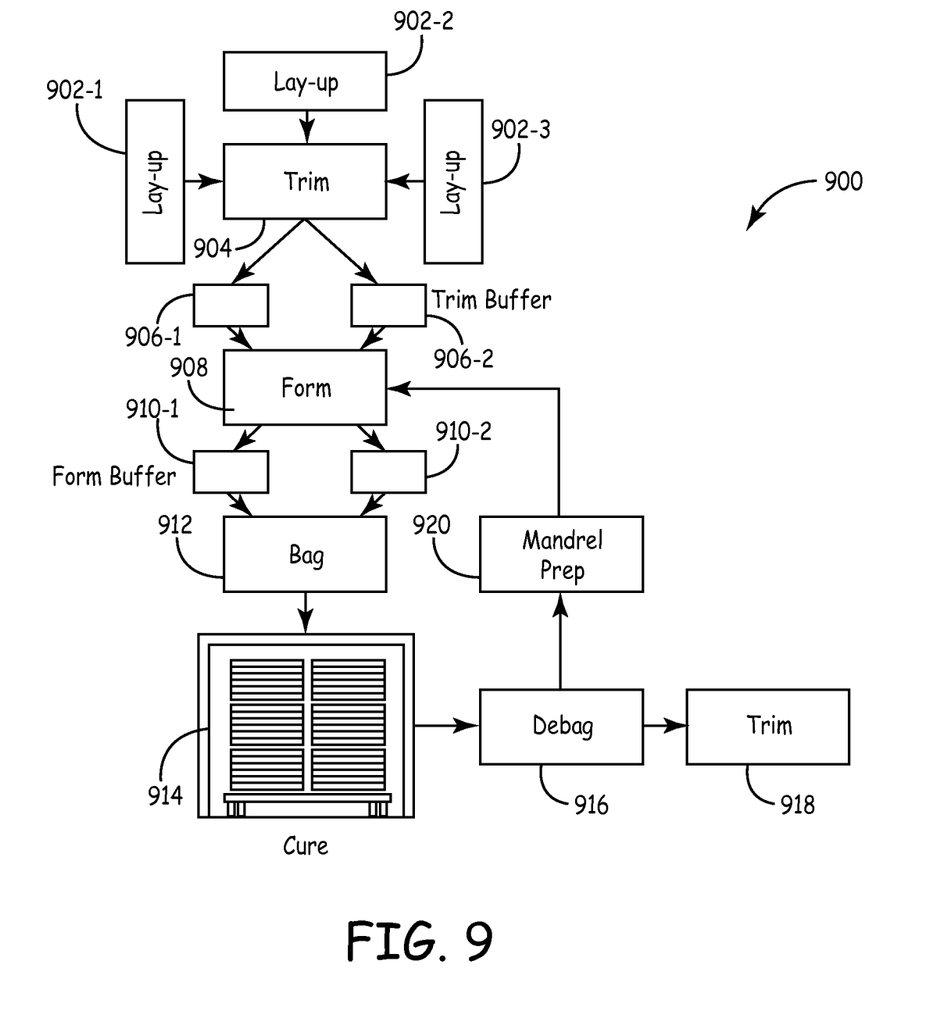
FIG. 9 illustrates a process layout of one embodiment of the present invention.

Referring to FIG. 9 a process layout 900 illustrating one method of forming elongated members of an embodiment is illustrated. The process layout 900 starts with laying up preforms having the desired grooves and/or ridges on a mandrel at 902-1, 902-1 and 902-3. Hence more than one lay out station 902-1 through 902-3 can be used. This may be desired since the lay-up process will likely be the longest process in the process layout 900. Moreover, as illustrated and described above in regards to FIGS. 5 and 6, the preforms maybe made from nested preform blanks 600. Once the lay up of the preforms has been completed, they are brought to a trim station 904 where they are trimmed as desired. An example of trimming laid up nested perform blanks to obtain preforms 720 is illustrated and described in regards to FIGS. 7A through 7D. Trim buffers 906-1 and 906-2 are used to store the trimmed preforms for further processing. The trimmed preforms are then taken from the respective trim buffers 906-1 and 906-2 and shaped into elongated members in the form station 908. An example of a form station 908 is forming station 800 described and illustrated in regards to FIGS. 8A and 8B. In an embodiment that uses heat and pressure during the formation of the elongated member, the formed elongated members will be consolidated enough that they may not require an autoclave to produce low void content for most applications. Hence, as discussed above, in some embodiments, the elongated member is complete after the elongate member is formed.

In embodiments that require further curing, the elongated members may be cured in a conveyer oven or another type of curing system such as, but not limited to, batch curing in an autoclave as further illustrated in FIG. 9. As the process layout 900 of FIG. 9 further illustrates, in this embodiment, the elongated members formed in the form station 908 are then stored in buffers 910-1 and 910-2 for further process. The further process in this embodiment includes placing the elongated members in vacuum bags at bag station 912 for further compression. The bagged elongated members are then placed in an autoclave at cure station 914. Once cured, the vacuum bags are then removed at the debag station 916. If further trimming of the elongated member is required, it takes place at trim station 918. The product is then complete. The mandrel used in the form station 908 in one embodiment is prepared for the next batch of elongated members in the mandrel prep station 920 as illustrated in FIG. 9.

Figure 10:
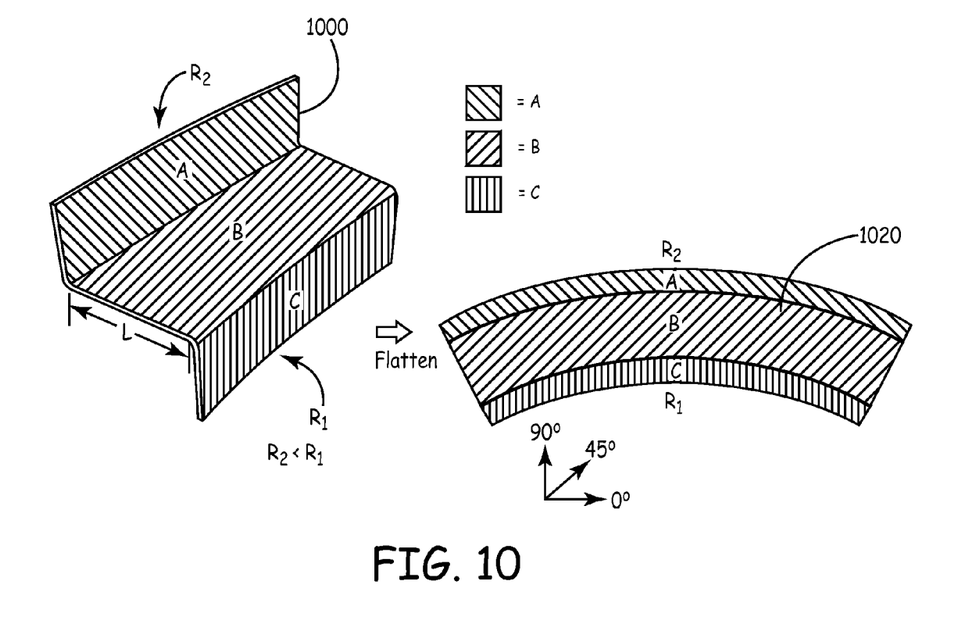
FIG. 10 illustrates a front perspective view of an elongated member illustrating different zones of one embodiment of the present invention.

FIG. 10 illustrates an elongated member 1000 formed with the process as described above. Elongated member 1000 is formed from a preform 1020 that is curved along its length into a Z-shape that could be used as a stiffener in the frame of an aircraft or any other application requiring the specific shape. Also illustrated in FIG. 10 are zones A, B and C that make up the elongated member 1000 and radius' $R_1$ and $R_2$. As discussed above, laying up preforms involves applying layers of fibers. Each fiber layer may have a different fiber orientation than another fiber layer. Common fiber orientations include 90 degree plies and minus and positive 45 degree plies although any orientation can be used and the present invention is not limited to just 90 degree and 45 degree plies. Fiber orientation refers to the angle upon which the fibers extend from an edge of elongated member such as a radius edge of a curved elongated member. Although it is possible to create bends in elongated curved members that are relatively wrinkle free with current ASFM-R, current ASMF-R has limitations to the length L of zone B in curved elongated members with 90 degree plies. The length L of zone B of an elongated member 1000 that is curved along its length that is formed only with an ASMF-R has to be under a certain distance when using 90 degree plies (and to a lesser extend 45 degree plies) or bunching/wrinkling in zone C or gaps/tearing in zone A will occur using an ASMF-R. In embodiments as discussed above, curved elongated members having length L greater than the current maximum distance on the ASFM-R in zone B is possible.

Figure 11:
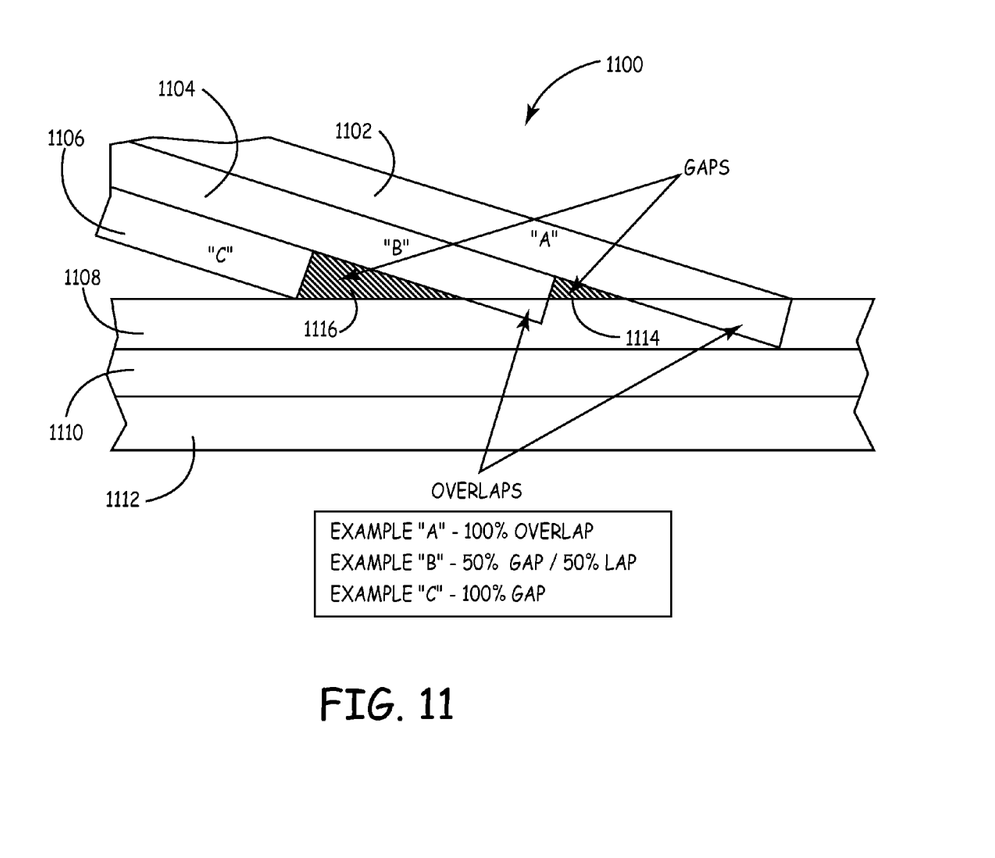
FIG. 11 illustrates fiber placement in a curved elongated member of one embodiment of the present invention.

Processes set out above are further enhanced to prevent bunching/wrinkling and gaps/tearing in elongated curved members by dropping and adding tows during the fiber placement process of 90 degree plies and by utilizing tow steering along with dropping and adding tows for 45 degree plies. Examples of adding and dropping tows 1100 that is used in some curved embodiments are illustrated in FIG. 11. As FIG. 11 illustrates, a first group of parallel tows, 1108, 1110 and 1112 extend at a first direction of orientation. A second group of parallel tows 1102, 1104 and 1106 having a second direction of orientation are coupled to the first group of tows 1108, 1110 and 1112. This example illustrates how tow 1102 labeled "A" overlaps tow 1108 100%, how tow 1104 labeled "B" overlaps tow 1108 50% and how tow 1106 labeled "C" overlaps tow 1108 at 0%. The example, also illustrates, gaps 1114 and 1116 that occur because of the different orientations and different overlap arrangements. Hence, different overlaps having different gaps can be achieved by adding and dropping tows to achieve a composite structure having desired characteristics. The ability to control the amount of overlap anywhere between the "A" 100% overlap and "C" 0% gap is common with current fiber placement machines and machine control software. Moreover, as further discussed above, the tow steering can be used in some embodiments to positions the tows on a desired curved path. Adding tows, dropping tows or tow steering in some embodiments can prevent undesired results in curved elongated members such as bunching/wrinkling in zone C or gaps/tearing in zone A of the elongated curved member 1000 of FIG. 10.

Figure 12:
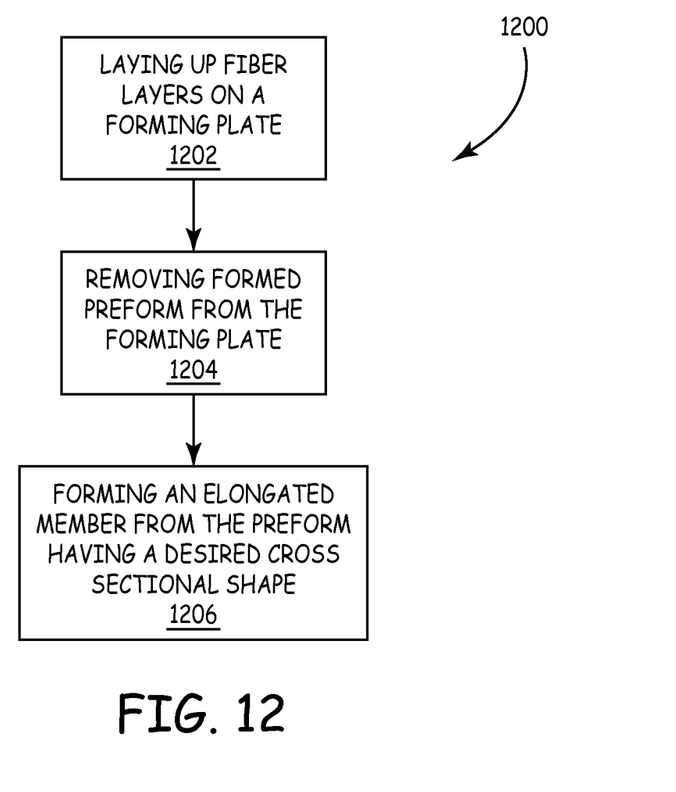
FIG. 12 illustrates a flow process diagram of one embodiment of the present invention.

Referring to the flow process diagram 1200 of FIG. 12, a further summary of embodiments is provided. As the flow process diagram 1200 illustrates, the process starts by laying up fiber layers (or ply layers) on a forming plate to form a preform (1202). As discussed above in regards to FIG. 6, in one embodiment, nested blanks of preforms are laid up at the same time on a mandrel having a forming plate. Further in embodiments where the elongated members are curved along their length, as discussed in regards to FIG. 10, the tows or fibers are laid down with techniques that prevents bunching, wrinkling, gaps and tearing. The techniques may include as discussed above, tow steering and dropping and adding tows depending on the orientation of the tows. The lay up of the preform in one embodiment is done with fiber placement technology. In one embodiment, unidirectional tape (uni-tape) is used. Uni-tape has fibers or tows placed on a backing (tape) that are all in the same orientation (for example, but not limited to, 90 degrees, 45 degrees or 30 degrees). Tows in one embodiment are layered on the forming plate to form a laminate that is the preform. Each layer, which is heated to enhance tackiness between layers, is typically pressed onto the prior layer with the use of rollers and the like. As further discussed above, the forming plate upon which the preform is laid up includes grooves and ridges that define corners or bends of the formed elongated member. Examples, of grooves and ridges in a preform are illustrated in FIGS. 2A, 3A, 4A and 8A as discussed above.

Once, the preform has been formed, it is removed from the forming plate (1204) as further illustrated in flow process diagram of FIG. 12. Each preform is then formed into an elongated member having a desired cross-sectional shape (1206). Examples of cross-sectional shapes are illustrated in FIGS. 2B, 3B and 4B as discussed above. In some embodiments, the preform is compressed over a forming tool to achieve the desired shape, with the grooves and ridges in the preform aligning with corners of the forming tool. In one embodiment, the forming tool is heated to cure the elongated member once it is formed. Hence in this embodiment, forming and curing is done in one step. In other embodiments, as discussed above in regards to FIG. 10, separate curing processes are employed. Further in other embodiments, ASFM-R or ASFM-L are used to form the preform into the desired cross-sectional shape.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of forming composite elongated members, the method comprising:
    forming a preform having at least one of a groove and a ridge on a forming plate having at least one corresponding groove and ridge during a first process, the at least one groove and ridge of the formed preform extending a length of the preform;
    removing the formed preform from the forming plate; and
    shaping the formed preform after removal to create the elongated member having a desired cross-sectional shape with at least one bend formed along at least one of the at least one groove and ridge on a tool during a second process.

2. The method of claim 1, wherein forming the preform further comprises:
    laying up at least one ply layer on the forming plate having the at least one corresponding groove and ridge.

3. The method of claim 2, wherein the forming plate is configured to form curved elongated members, the method further comprising at least one of dropping, adding and tow steering during the laying up of the at least one ply layer.

4. The method of claim 1, wherein forming the preform further comprises:
    laying up ply layers on a forming plate having at least one of a groove and a ridge, wherein the ply orientation of one ply layer is different than the orientation of at least one other ply layer.

5. The method of claim 1, wherein forming the preform further comprises:
    laying up at least one ply layer on the forming plate of a mandrel, the forming plate configured to pattern a nested preform; and
    cutting the nested preform to form a plurality of preforms.

6. The method of claim 5, further comprising:
    trimming each of the plurality of preforms.

7. The method of claim 1, wherein shaping the preform to create the elongated member having a desired cross-sectional shape with at least one bend formed along at least one of the at least one groove and ridge, further comprises:
    heating the preform; and
    compressing the preform to the desired cross-sectional shape.

8. The method of claim 7, further comprising:
    placing the preform in a forming station;
    aligning each corner on a forming tool in the forming station with an associated one of the at least one groove and ridge; and
    inflating a bladder within a pressure box of the forming station with hot air to compress the preform on the forming tool.

9. The method of claim 7, wherein shaping the preform to create the elongated member having a desired cross-sectional shape with at least one bend formed along at least one of the at least one groove and ridge is done with one of a radial automatic stiffener and forming machine (ASFM-R) and a linear automatic stiffener and forming machine (ASFM-L).

10. The method of claim 1, further comprising:
    curing the elongated member.

11. The method of claim 10, further comprising:
    vacuum bagging the elongated member;
    placing the elongated member in the vacuum bag in an autoclave to cure the elongated member;
    removing the elongated member from the autoclave when the autoclave process is through; and
    debagging the elongated member after the elongated member has been removed from the autoclave.

12. A method of forming an elongated member, the method comprising:
    laying up ply layers on a mandrel having at least one of a ridge and a groove to form at least one preform having a corresponding at least one ridge and groove extending along a length of the preform during a first process;
    removing the at least one formed preform from the mandrel; and
    forming an elongated member after removal having a select cross-sectional shape that includes at least one bend from the at least one formed preform on a tool with a second process, wherein the at least one bend is formed along the at least one of the ridge and groove in the formed preform.

13. The method of claim 12, further comprising:
    curing the elongated member.

14. The method of claim 13, wherein curing the elongated member occurs during formation of the elongated member.

15. The method of claim 12, further comprising:

laying up the ply layers in a manner to prevent at least one of bunching, wrinkling, gaps and tears when the elongated member is curved along its length.

16. The method of claim 12, wherein forming an elongated member having a select cross-sectional shape that includes at least one bend from the at least one preform further comprises:

compressing the preform on a forming tool that has the desired cross-sectional shape of the elongated member.

17. The method of claim 16, further comprising:

aligning the at least one bend on the at least one forming tool with the at least one of the ridge and groove of the preform.

18. The method of claim 16, further comprising:

heating the forming tool to cure the elongated member.

19. A method of forming a preform that can be used to form elongated composite members, the method comprising:

laying up ply layers on a forming surface of a mandrel that has at least one of a ridge and a groove;

heating and pressing each ply layer to a prior ply layer to enhance tackiness and to shape the ply layers to have at least one of a ridge and a groove that corresponds to the at least one of a ridge and a groove on the forming surface of the mandrel to form a preform;

removing the ply layers from the forming surface of the mandrel once the preform is formed; and shaping the preform after removal on a different tool to create a composite member having corners formed along the at least one ridge and groove of the preform.

20. The method of claim 19, wherein the forming surface of the mandrel is configured to pattern a nested preform, the method further comprising:

cutting the nested preform to form a plurality of preforms.

21. The method of claim 20, further comprising:

trimming each of the plurality of preforms.

* * * * *